United States Patent [19]
Priesemuth

[11] Patent Number: 5,149,924
[45] Date of Patent: * Sep. 22, 1992

[54] MULTIPLE CONTACT SWITCH ARRANGEMENT

[76] Inventor: Wolfgang Priesemuth, Postkamp 13, Breitenburg-Nordoe, Fed. Rep. of Germany

[*] Notice: The portion of the term of this patent subsequent to Oct. 30, 2007 has been disclaimed.

[21] Appl. No.: 522,385

[22] Filed: May 11, 1990

[30] Foreign Application Priority Data

May 31, 1989 [DE] Fed. Rep. of Germany ....... 3917637

[51] Int. Cl.⁵ .............. H01H 9/00; H01H 1/58; H01H 23/24
[52] U.S. Cl. .................. 200/5 R; 200/339; 200/315; 200/461
[58] Field of Search ........... 200/5 R, 5 E, 6 R, 6 B, 200/6 BA, 6 BB, 6 C, 461, 339, 1 B, 315

[56] References Cited

U.S. PATENT DOCUMENTS

| | | | |
|---|---|---|---|
| 2,916,566 | 12/1959 | Meyer et al. | 200/6 BB X |
| 2,966,559 | 12/1960 | Meyer | 200/6 BB |
| 2,968,703 | 1/1961 | Meyer et al. | 200/6 BB |
| 3,131,265 | 4/1964 | Toruk | 200/6 BB |
| 3,254,163 | 5/1966 | Wanlass | 200/6 B X |
| 4,967,043 | 10/1990 | Killarney | 200/339 X |
| 4,967,046 | 10/1990 | Priesemuth | 200/461 X |

Primary Examiner—J. R. Scott
Attorney, Agent, or Firm—Robert W. Becker & Associates

[57] ABSTRACT

A contact switch arrangement is provided where from a nonoperative position two switch positions can be assumed via actuatable rocker-type switch units. Such a switch arrangement is especially provided for operating windows in motor vehicles. The arrangement includes a housing that also serves to accommodate switch elements. Provided in the housing are at least two separate switch element arrangements, each of which is actuatable via a separate rocker-type switch.

14 Claims, 5 Drawing Sheets

MULTIPLE CONTACT SWITCH ARRANGEMENT

BACKGROUND OF THE INVENTION

The present invention relates to a multiple contact switch arrangement, especially for operating windows in a motor vehicle, where from a nonoperative position two switch positions can be assumed via actuatable rocker-type switch means, with the arrangement including a housing that also serves to accommodate switch element means having switch springs that are provided with switch contacts.

Particularly applicable for electrical switches used in the automobile industry for carrying out widely differing functions, is that due to the immense cost pressure in the automobile industry, these switches must be capable of being produced extremely economically. For example, if switches are provided in a vehicle that can be operated from the driver's seat or from the passenger's seat for initiating raising or lowering of the windows next to the driver and/or passenger of the vehicle, these switches basically comprise respectively separate switches that are frequently placed in a console disposed between the driver and passenger seats. So that these generally identical switches can be positioned next to one another in the desired manner, extensive support and receiving constructions, as well as electrical plugs, are needed and are respectively associated with the switches so that the same can be mounted and electrically connected with the power supply of the vehicle. The two separate switches are frequently additionally covered by a frame construction that as an additional component relatively exactly covers the two switches in the form of a shield, and must in turn be suitably connected with the console via a separate support frame.

In view of the fact that the console of a vehicle, especially a passenger car console disposed between the driver's and passenger's seats, is increasingly being used to accommodate other, additional components, such as a mobile telephone or even a computer, additional space is required since such components, just like the components that are absolutely necessary for the actual operation of the vehicle, should be just as accessible from the driver's and passenger's seats.

In addition to the relatively complicated installation of the known switches, as described above and which includes a number of additional parts, the known switches, especially if several of them have to be provided, have the drawback that they require a relatively large amount of space, which due to the aforementioned reasons (required space for other components) is basically no longer acceptable.

It is therefore an object of the present invention to provide a contact switch arrangement, especially for operating windows in motor vehicles, that is economical to produce, has a simple construction, and has considerably smaller external dimensions than do the heretofore known switches.

BRIEF DESCRIPTION OF THE DRAWINGS

This object, and other objects and advantages of the present invention, will appear more clearly from the following specification in conjunction with the accompanying schematic drawings, in which:

FIG. 8b is a cross-sectional view through the housing of FIG. 8a;

FIG. 10b is a cross-sectional view through the housing of FIG. 10a;

FIG. 11b is a cross-sectional view through the housing of FIG. 11a; and

SUMMARY OF THE INVENTION

Figure 3:
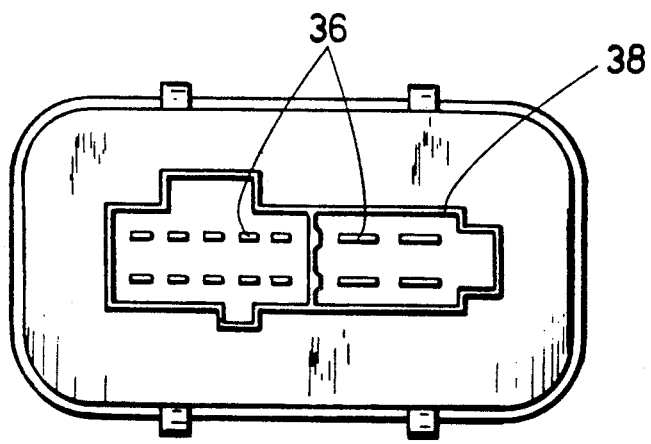
FIG. 3 is a bottom view showing the prongs of the switch arrangement.

The switch arrangement of the present invention is characterized primarily by at least two separate switch element means, each of which is actuatable via a separate rocker-type switch.

The advantage of the inventive contact switch arrangement is essentially that via a single switch arrangement, at least two switching functions can be separately carried out, for example the raising and lowering of the window of the driver and the raising and lower of the window of the passenger of a motor vehicle. Since the inventive contact switch arrangement is basically a single operable unit, it is possible with a single connection process, and with a single mounting process, to place the switch arrangement in a console and to electrically connect the same. No securement and cover frames are needed that, as with the heretofore known individual switches, must then position the switches relative to one another and cover the mounting slots. As a result of the inventive construction, it is possible to satisfy the object of the present invention and to make the switch arrangement extremely small, since only one housing wall is required, and the entire switch arrangement can be produced in a single manufacturing process, thus completely realizing another object of the present invention, namely that the switch arrangement be economical to produce.

A further significant advantage of the inventive contact switch arrangement is the ergonomically particularly important and in fact achieved close arrangement of the two rocker-type switches next to one another in order to make it possible, for example for the driver of a motor vehicle, to be able to effect the raising and lowering process of one or the other window simply by sliding the finger from one rocker-type switch to the other with no difficulty and without having to look down. This is extremely important since while driving the driver should not look down or to the side in order to search for the correct switch arrangement or rocker-type switch thereof in order to operate one or the other window.

Pursuant to a further advantageous specific embodiment of the present invention, the housing can accommodate four separate switch element means, each of which is actuatable via a separate rocker-type switch. Such an embodiment, which otherwise has the same construction as previously described, is provided in a vehicle if, for example, four windows are to be raised and lowered, and it is desired that these functions also be controlled from the console between the driver's and passenger's seats. In this case, the two switch element means or rocker-type switches for the two front windows of the vehicle are generally disposed next to one another, and the rocker-type switches or switch element means for operating the two rear windows are similarly disposed next to one another, with the two pairs of rocker-type switches or switch element means respectively being disposed behind one another, which also corresponds to the placement of the respective windows in the vehicle.

As previously mentioned, electrical switch arrangements that are used in the automobile industry must have a relatively simple construction so that they can be economically produced. However, this ability to manufacture in an extremely economical manner must in no way be achieved by compromising the operational reliability, especially since the switch arrangements in automobiles generally have extremely important switching tasks, such as the described raising and lowering of windows, the switching of lights, etc., which to a great extent is relevant to the general safety of the vehicle. Inherent with the pressure to miniaturize the switch arrangement are increasing requirements for the operational reliability and, as previously mentioned, to keep the manufacture costs low. Pursuant to the present invention, a simple construction and an extremely reliable operation with very small dimensions is achieved by having the essentially flat switch springs be acted upon by actuating elements that act as push rods and are pivotably connected to the rocker-type switch. As a result, the switch elements can be disposed in the lower portion of the arrangement, with the switch elements being activated via the push rod-like actuating elements by the rocker-type switch, which can be disposed relatively far from the switch elements. The switch arrangement, i.e. the switch elements thereof, can in addition be preassembled in a ready to operate manner. This applies equally well for the version having four switch elements or rocker-type switches and the version with two switch elements or switches, which is extremely important in order to be able to produce the arrangement in an economical manner; depending upon the type of assembly system that is involved, the remaining parts of the switch arrangement can be installed.

In principle, the actuating elements can be embodied in any desired manner as long as they are suitable for bridging the free path between the rocker-type switch and the switch springs. However, the actuating elements are advantageously in the form of small flat plates that can be produced in a very simple manner in a single punching process, for example from metal. The actuating elements are advantageously longitudinally displaceably received, on two opposite sides, in guide means that can be integrally formed with the housing. This, in turn, has the advantage that during assembly of the prefabricated parts, the small plates can be received in a guided manner, thus eliminating adjustment during assembly, and also eliminating a complicated assembly process. A particularly critical area in switch arrangements of this type is the actual switch springs, especially, as in the present situation, where large currents are guided over the contacts, as occurs, for example, during the operation of motors for raising and lowering windows of motor vehicles. For cost reasons, these currents are conveyed directly over the contacts of the switches, and not, as was previously common, over separate relays that are merely actuated by the switches. Initial tests with switch arrangements of the inventive type, where the power for window-actuation motors was conveyed directly over the switch contacts, showed that the switch contacts were flung back and forth while carrying out the switching function; this inevitably led to an undesired alternating switching on and off of the motors, and in addition very quickly wore out the contacts of the switch springs. To resolve this problem, it is advantageously proposed pursuant to the present invention that the switch springs have an essentially rectangular, frame-like surface area, with an arm, which has a wavelike cross-sectional configuration, extending from one narrow side of the switch spring into the interior that is free of material. This arm ensures a suitably set pretension for the switch spring, so that as desired or designed, independent of the actuating force of the rocker-type switch, a specific, adequate minimal pressure of the contacts on the switch spring side will be exerted upon the corresponding counter-contacts when the rocker-type switch is actuated. This minimal pressure is sufficient to completely preclude the back and forth flinging of the switch springs that occurs with the heretofore known switch arrangements of this type.

Pursuant to a further advantageous specific embodiment of the present invention, a switch spring holder engages between the free end of the arm and the other narrow side of the switch spring. The switch spring holder is advantageously held by two holding elements thereof that are provided with engagement means. In this way, a very simple assembly of the switch spring, and a reliable mounting thereof in the assembled state, are possible, whereby in conjunction with the aforementioned wavelike configuration of the arm of the switch spring, an automatic adjustment during assembly of the switch spring, and an automatic adjustment of the tension thereof, are achieved. The engagement means in the switch spring holder are advantageously formed by holding recesses thereof that essentially extend parallel to the switch spring.

In order to keep the manufacturing costs for the contact switch arrangement as low as possible, it is proposed pursuant to a further advantageous specific embodiment of the present invention that the switch spring holder be integrally connected with a plug (contact prong) that projects out of the housing, whereby the remaining contacts, against which the switch springs, which are provided with contacts, rest in the active and passive state, on that side disposed opposite the rocker-type switch, also extend through the housing in the form of prongs that can be introduced into a socket. Thus, all of the contact means, including the switch spring holders, can be integrally embodied with plugs or contact prongs, and project outwardly through appropriate holes in the housing.

In this connection, the plugs or prongs are advantageously surrounded by a casing that essentially extends parallel thereto. On the one hand, the casing serves to protect the prongs, and on the other hand serves to guide the prongs into a socket.

It is frequently necessary to show the momentary actuation function of the contact switch arrangement, especially when it is dark outside. Generally in the past, illuminating devices were provided that were separate from the switches and that frequently had to be mounted separately or had to be additionally provided at the suitable location when the switch arrangement was disposed in the assembly region. With the inventive contact switch arrangement, an illuminating device is advantageously provided in the region between the switch element and the rocker-type switch, with the illuminating device being disposed in a dish-like reflector that is open in a direction toward the rocker-type switch. This has the advantage that the illuminating device itself, as well as the reflector, can be easily inserted during assembly of the contact switch arrangement, and no separate sleeve or other support, which would make the arrangement more expensive, has to be provided for the illuminating device. Particularly suitable illuminating devices include, for example, light emitting diodes that are available in a wide variety of colors, and which relative to conventional bulbs have the advantage that although they provide a good illuminating power, they use little current and exhibit very little dissipation loss, i.e. an unnecessary development of heat is avoided.

Finally, it is advantageous that the switch elements themselves be surrounded by a casing that can, for example, be clipped to the housing or be secured thereto in some other manner. This considerably simplifies assembly of the contact switch arrangement, and makes it more economical to produce, since if the casing is not yet present during the assembly process, the individual switch elements can be placed relatively easily, be it automatically or manually, since without the presence of a casing access into the region of the switch elements from the outside is possible in a nondisruptive manner. Then only after the assembly process, including the assembly of the rocker-type switch, is concluded is the casing placed over the rocker-type switch, i.e. from the side of the switch, onto the housing and is clipped or otherwise connected thereto. After the casing is connected to the housing, the contact switch arrangement is finish-assembled and is ready to be inserted into a motor vehicle or some other receiving location.

In motor vehicles having electrically operated windows, it is not unusual to provide a separate protection or lock-out switch that can be operated by the driver or front passenger to ensure that people, especially children, that are sitting in the back seat of the vehicle cannot readily operate the parallelly connected rocker-type switches for operating the rear windows; this could also prevent accidents. In the past, such lock-out switches have been separate switches to the rocker-type switches that operate the windows; although these separate switches are associated with the main rocker-type switches in order to be able to partially interrupt their function, the lock-out switches generally have to be produced, assembled, and covered separately, and furthermore require additional space. For this reason, it is advantageous that the contact switch arrangement be provided in its own housing with a lock-out switch to electrically interrupt one or more of the switches that are separate from the main switches. Thus, this lock-out switch can be integrally embodied with the contact switch arrangement and requires no additional space in the console; furthermore, no additional separate assembly nor separate connection is required.

So that the driver or passenger can recognize the switching state of the lock-out switch, an illuminating device is associated with the lock-out switch in the housing. This illuminating device illuminates, for example, when the switches disposed in the back seat of the vehicle for operating those windows are locked out, and which is no longer illuminated when also these switches in the back seat can be individually actuated.

Further specific features of the present invention will be described in detail subsequently.

DESCRIPTION OF PREFERRED EMBODIMENTS

Referring now to the drawings in detail, in the illustrated embodiment the contact switch arrangement 10 comprises four separate rocker-type switches 11, 110, 111, 112, each of which has separately associated therewith two switch elements 14, 15; 140, 150; 141, 151; 142, 152. Since the four rocker-type switches, and the switch elements associated therewith, fundamentally have the same construction, merely the switch 11 will be described subsequently in conjunction with the switch elements 14, 15 associated therewith.

Figure 1:
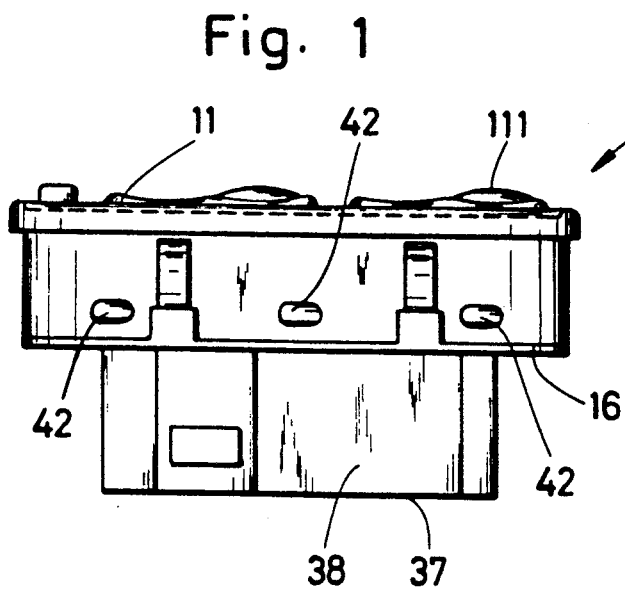
FIG. 1 is a view of the wide side of one exemplary embodiment of the inventive switch arrangement.
Figure 2:
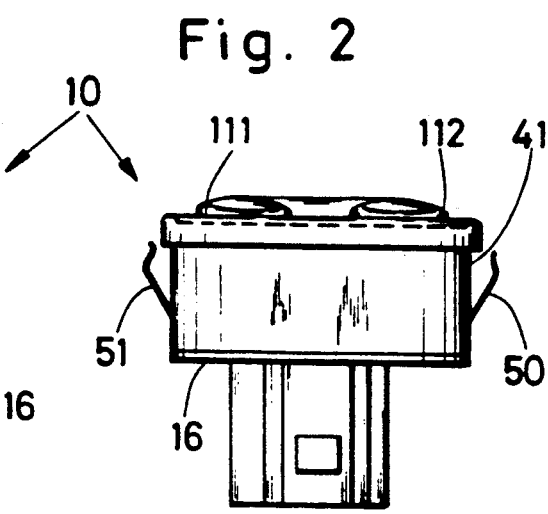
FIG. 2 is a view of the narrow side of the switch arrangement of FIG. 1.

The contact switch arrangement 10 essentially comprises a housing 16, the interior of which serves to accommodate and hold switch elements 14 and 15, as well as a manually operated rocker-type push mechanism 11 for moving the push mechanism elements 14, 15 out of a rest position into two end or switch positions 12, 13. To accomplish this, the rocker-type switch 11 is pivotable about a shaft 63 or other non-illustrated appropriate mounting means that are provided in the housing 16. Appropriate mounting means can comprise suitable holes that are essentially formed in the housing 16 at appropriate locations, with similarly non-illustrated projections that are formed on the push mechanism 11 engaging these holes. In the vicinity of the push mechanism 11 and the switch elements 14, 15, the housing 16 is surrounded by a casing 41 that can be connected to the housing 16 via clip means 42. After the final assembly of the contact switch arrangement 10, the casing 41 is inserted from above, see FIG. 1, over the rocker-type switch 11 and is held via the aforementioned clip means 42.

By means of clip springs 50, 51 that are securely connected to the housing 16, the contact switch arrangement 10 can be held at a receiving location, for example a motor vehicle console disposed between the driver's and passenger's seats, so that no separate securement means are required.

The lower portion of the contact switch arrangement 10, i.e. the underside 37 (see FIGS. 1 and 3), is embodied in the manner of a plug; in otherwords, it is provided with a number of plugs or prongs 36 that are connected or integrally formed with corresponding contacts of the switch elements 14, 15; this will be described in detail subsequently. The prongs 36 that project out of the housing 16 at the underside 37 are also surrounded by a casing 38, similar to the casing 41 that surrounds the housing 16 above it; the casing 38 extends essentially parallel to the blade-like prongs 36. However, in contrast to the casing 41, the casing 38 is integrally connected with the housing 16. The number of prongs 36 essentially depends upon the number of circuits that are to be closed or opened in the first and second switch positions; in other words, the switch elements 14, 15 can individually and selectively be designed as openers or closers, or both.

Figure 6:
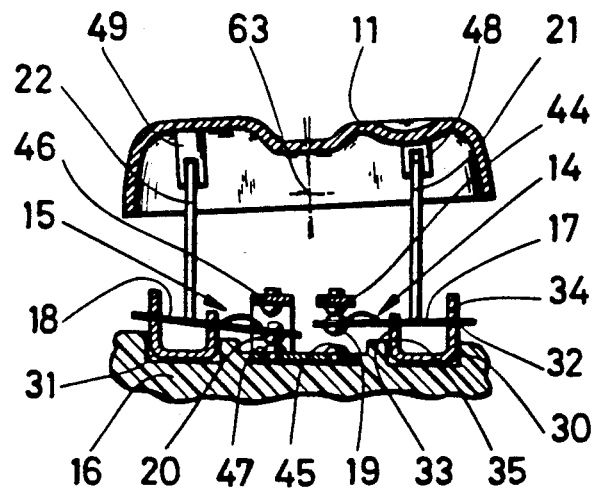
FIG. 6 is a cross-sectional view of the switch arrangement of FIG. 5, with noncritical parts being left out to illustrate and explain the function of the switch elements.
Figure 7:
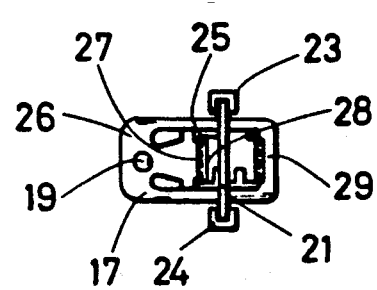
FIG. 7 is a plan view of a switch spring that is held by a switch spring holder and is acted upon by an actuating element.
Figure 8A:
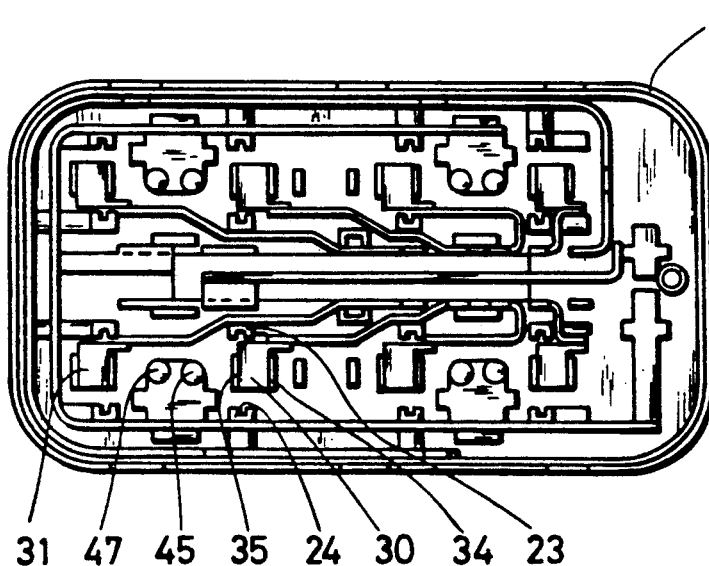
FIG. 8a is a plan view of the housing of the switch arrangement in a first assembly state.
Figure 8B:
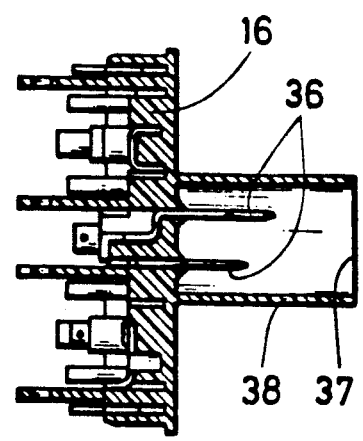
Figure 9:
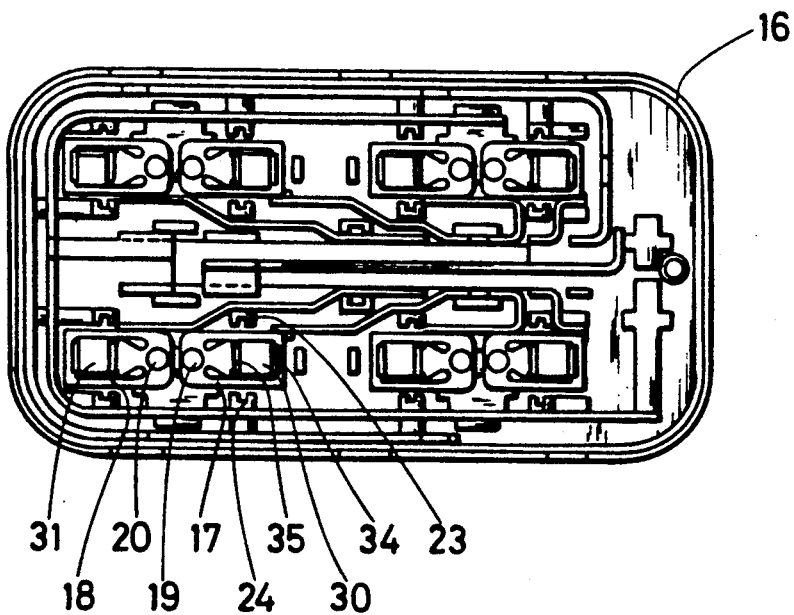
FIG. 9 is a plan view of the housing of the switch arrangement assembly state in which the switch springs have been installed.
Figure 10A:
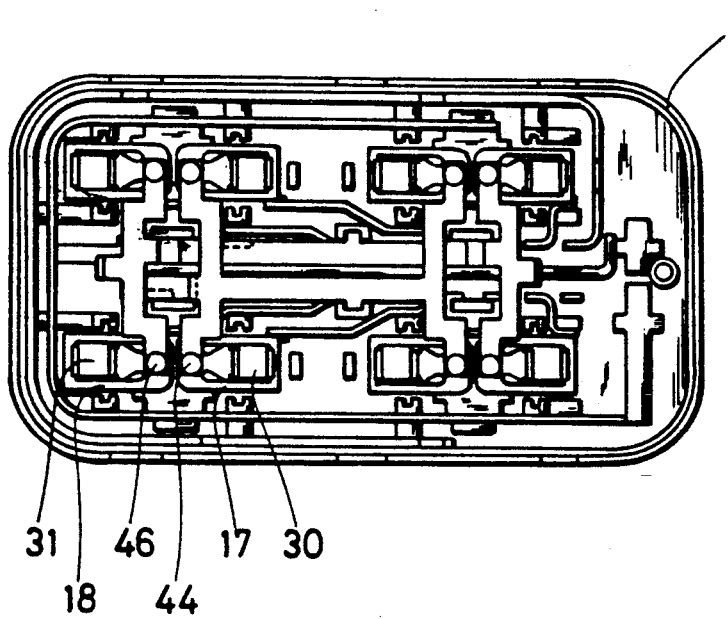
FIG. 10a is a plan view of the housing of the switch arrangement showing a third assembly state.
Figure 10B:
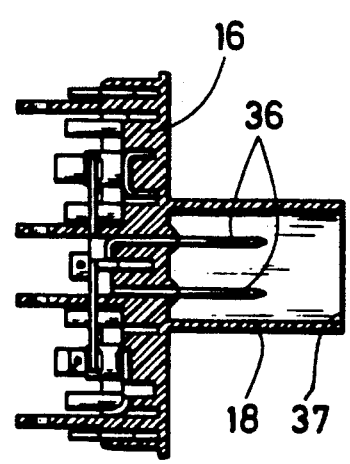

Disposed in the vicinity of the base of the housing 16, on opposite sides, are in each case at least one respective switch spring holder 30, 31, which has two U-shaped holding elements 34, 35. In the illustrated embodiment, the holding elements 34, 35 and the switch spring holders 30, 31 are integrally connected with the prongs 36 that are respectively associated therewith. However, it should be understood that such an integral design of the switch spring holders 30, 31 is not necessary in all cases. The holding elements 34, 35 are provided with engagement means 32, 33 on their respective legs; in the illustrated embodiment, these engagement means are formed by notches or slots that essentially extend parallel to the base of the housing 16. Seated in the engagement means 32, 33 or slots are respective switch springs 17, 18 that have an essentially rectangular, frame-like surface area (see FIGS. 6 and 7). The switch springs 17, 18 are formed from a suitably selected metallic spring material, and constitute a stamped part that is embodied in such a way that, as shown in FIGS. 6 and 7, an arm 27, which has a wavelike cross-sectional configuration, extends into the interior 25, which is free of material, from a narrow side 26. The free end 28 of the arm 27, and the other narrow side 29 of the switch springs 17, 18, engage the switch spring holder 30, 31 in the region of the notch-like engagement means 32, 33. By means of a suitable selection and embodiment of the wavelike cross-sectional configuration of the arm 27, the switch spring 17, 18, after it has been brought into engagement with the switch spring holder 30, 31, is pretensioned, and in particular in the direction toward appropriate nonoperative or working contacts 44, 46; 45, 47. These nonoperative and working contacts can similarly be integrally embodied with corresponding plugs 36, and project from the housing 16 in a direction toward the underside 37. Provided on the first narrow side 26 of the switch spring 17, 18 is a contact 19, 20 that comes into contact with the aforementioned nonoperative and working contacts 44, 46; 45, 47 when an actuating element 21, 22 is manipulated via the rocker-type push mechanism 11.

The actuating element 21, 22, which acts upon the corresponding switch element 14, 15, is disposed essentially perpendicular thereto, whereby the actuating element 21, 22, which acts as a push member operated by the rocker-type push mechanism 11, is pivotably connected to the push mechanism 11 and can move back and forth in guide means 23, 24 (FIG. 7) that can be formed as a part of the housing 16. The actuating elements 21, 22 are in this embodiment in the form of small flat plates, and are connected to the rocker-type push mechanism 11 via U-shaped tracks 48, 49 that are disposed on that inner side of the push mechanism 11 that faces the housing 16. That side of the small plate-like actuating elements 21, 22 that is remote from the rocker-type push mechanism 11 merely rests upon the essentially flat switch spring 17, 18, and in particular in the region between the U-shaped holding elements 34, 35 of the switch spring holder 30, 31. When viewed in the vertical direction, see FIG. 6, the engagement means 33 that is directed toward the middle of the housing 16 is offset downwardly relative to the outwardly directed engagement means 32, so that the distance of the engagement means 33 to an imaginary housing bottom is less than the distance of the engagement means 32 therefrom. Consequently, the switch springs 17, 18 that are accommodated by the holding elements 34, 35, i.e. the engagement means 32, 33, attain the rest position due to the pretension of the wavelike arm 27 when the rocker-type push mechanism 11 is horizontal, i.e. the rest or nonoperative position of the contact switch arrangement 10. In the rest position of the switch springs 17, 18, the switch contacts 19, 20 thereof contact the pertaining nonoperative contacts 44, 46. When the rocker-type push mechanism 11 is activated into a first switch position 12 (see FIG. 6), the push mechanism 11 causes the actuating element 22 to be guided essentially vertically downwardly in the guide means 23, 24, so that due to the suitably selected wavelike cross-sectional configuration of the arm 27, the switch contact 20 of the switch spring 18 is moved with a predetermined force against the appropriately fixed switch contact 45, 47, and in particular independently of the force with which the rocker-type push mechanism 11 was moved by the person operating the same. Due to the inventive configuration of the switch spring 17, 18, there is no back and forth flinging of the free end of the switch spring 17, 18 and its corresponding switch contact 19, 20. Rather, with a specific minimal force, the active switch contact 20 rests upon the corresponding working contact 45, 47, where it is held. Thus, it is possible in a very simple manner to switch on high electrical currents not only for a short period of time, so that the inventive contact switch arrangement 10, if it is used to raise or lower the windows of motor vehicles, requires no special heavy duty relay to be interposed.

If the rocker-type push mechanism 11 is released, then due to the suitably selected spring tension of the switch spring 17, 18, an upward movement of the actuating element 21, 22 is caused, so that the push mechanism 11 can again assume a normal, essentially horizontal nonoperative position. It is to be understood that both of the switch positions 12, 13 of the contact switch arrangement 10 can be achieved in the same manner with the same means, so that it is not necessary to separately describe the operation of the other switch element.

Figure 4:
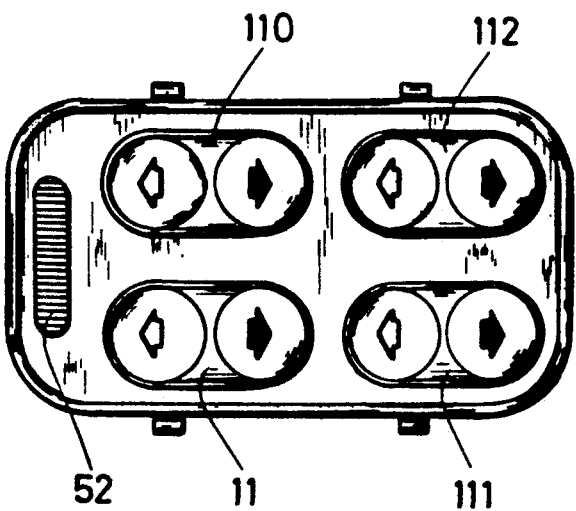
FIG. 4 is a top view showing the rocker-type switches of the inventive switch arrangement.
Figure 5:
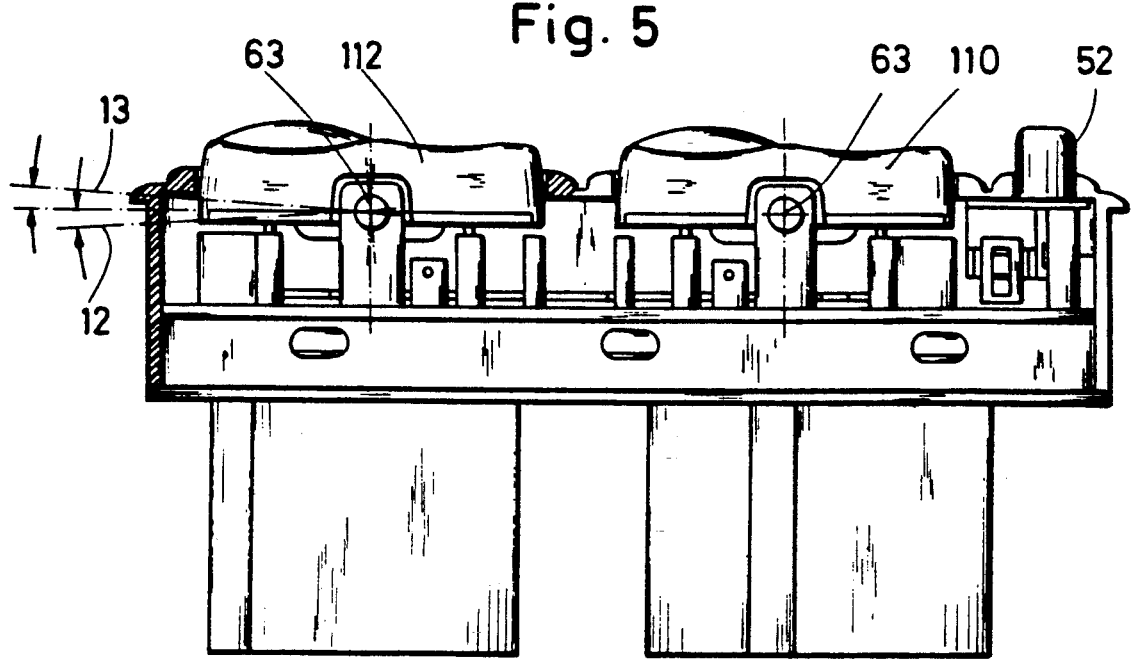
FIG. 5 is an enlarged, partially cross-sectioned view illustrating the pivot points of the rocker-type switches.
Figure 11A:
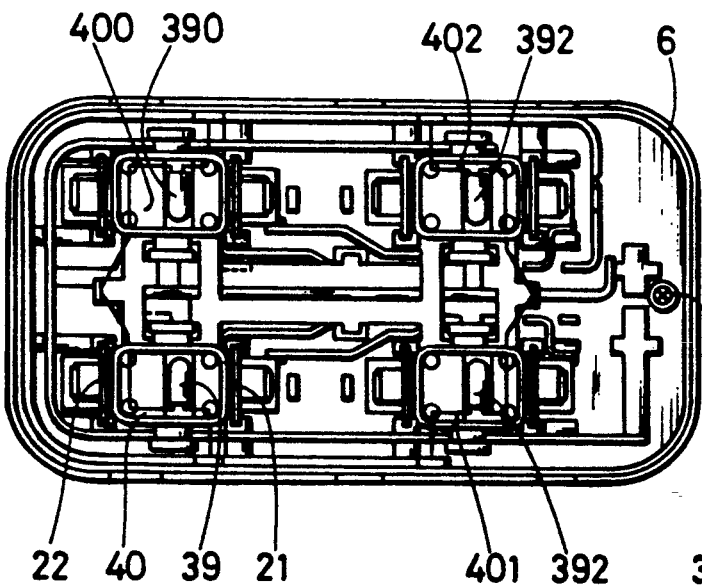
FIG. 11a shows the housing of the switch arrangement in a fourth assembly state.
Figure 11B:
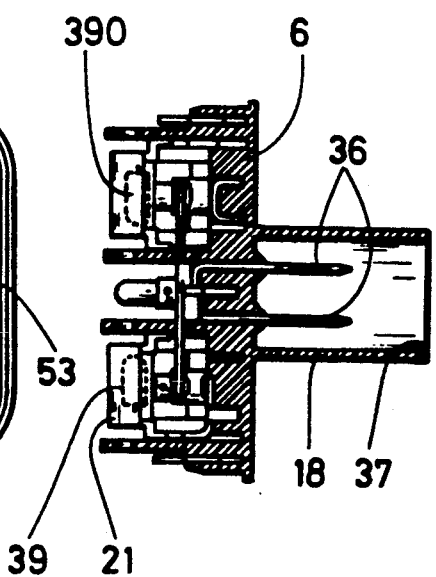
Figure 12:
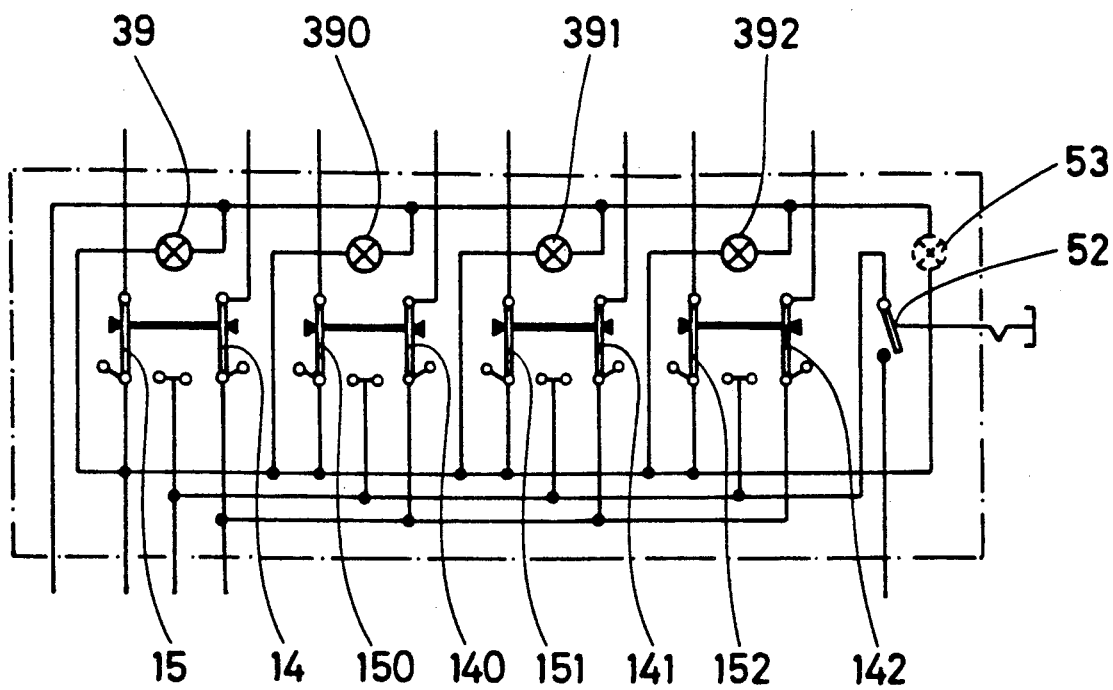
FIG. 12 is a circuit diagram of a multiple contact switch arrangement showing an additional protection or lock-out switch, as well as illuminating devices associated with the rocker-type switches and the lock-out switch.

Disposed in the region between the switch elements 14, 15 and the rocker-type push mechanism 11, which at least in the vicinity of its symbols, see FIG. 4, is partially transparent to light, is an illuminating device 39 (FIG. 11a) that is disposed in a dish-shaped reflector 40, 400, 401, 402 that is open in the direction toward the push mechanism 11. By means of the illuminating device 39, the respective actuation state of the rocker-type switch 11 can be indicated, and in general the switch 11 can be recognized in the dark. The illuminating device 39, 390, 391, 392 can, for example, be a light emitting diode of any desired color, or can also be a miniaturized bulb.

The rocker-type push mechanism 11, the housing 16, the casing 38, as well as the casing 41 can be made of a injection moldable plastic, or also from a glass-fiber reinforced polyamide. However, it is in principle possible to use any other type of plastic with or without reinforcement. The actual switch springs 17, 18 are made of suitable metallic spring materials, such as spring bronze. The contacts or prongs 36, including those that are integrally connected with the switch spring holders 30, 31, are made of metallic materials, for example suitable brass alloys.

In addition to the four rocker-type switches 11, 110, 111, 112 with the switch elements 14, 15; 140, 150; 141, 151; 142, 152 respectively associated therewith, a protection or lock-out switch 52 is disposed in the housing 16. The switch 52 serves to electrically lock out one or more contact switch arrangement or arrangements that are connected in parallel and are offset from the contact switch arrangement 10 that is generally disposed in the console of the vehicle, and which are generally disposed in the back seat area of a vehicle to operate the rear windows. Thus, this lock-out switch 52 serves to protect against unauthorized use of the two rear windows for the back seats of the vehicle, and also provides a child protection feature. The protection or lock-out switch 52 is generally embodied as a locking switch; in otherwords, it has a first or lower locking position, and can be transferred by further actuation out of this locking position and back into the starting position. The switch 52, i.e. the actuating element thereof, can also be light transparent, so that an illuminating device 53 disposed in the housing 16 can serve to indicate the switch state thereof.

The present invention is, of course, in no way restricted to the specific disclosure of the specification and drawings, but also encompasses any modifications within the scope of the appended claims.

What I claim is:

1. A multiple contact switch arrangement where from a nonoperative position two switch positions can be assumed via respective manually actuatable rocker-type switches, comprising:
   a housing for accommodating at least two of said rocker-type switches, each of which further comprises:
   switch element means mounted in said housing and having two essentially flat switch springs that are provided with switch contacts for interaction with contacts of operational circuit means;
   a manually operated rocker-type push mechanism that is pivotably mounted in said housing; and
   two actuating elements in the form of push members that are pivotably connected to said rocker-type push mechanism, are disposed essentially perpendicular to said switch springs, and each rest upon a respective one of said switch springs.

2. A contact switch arrangement according to claim 1, which comprises four of said rocker-type switches.

3. A contact switch arrangement according to claim 1, in which said actuating elements are embodied as small flat plates.

4. A contact switch arrangement according to claim 3, which includes guide means disposed in said housing accommodating said actuating elements in such a way that said actuating elements are longitudinally displaceable.

5. A contact switch arrangement according to claim 1, in which each of said switch springs has an essentially rectangular, frame-like configuration with an interior that is free of material, with an arm that has a wavelike cross-sectional configuration extending from one narrow side of said switch spring into said interior thereof.

6. A contact switch arrangement according to claim 5, in which said arm has a free end remote from said one narrow side; and which includes for each of said switch springs a switch spring holder that is mounted in said housing and engages between said free end of said arm and the other narrow side of said switch spring.

7. A contact switch arrangement according to claim 6, in which said spring holder has holding elements that are provided with two engagement means for holding said switch spring.

8. A contact switch arrangement according to claim 6, in which said spring holder is integrally connected with prong means extending from said housing and forming electrical terminals.

9. A contact switch arrangement according to claim 8, in which said prong means extend from said housing remote from said rocker-type switch.

10. A contact switch arrangement according to claim 9, in which said prong means are surrounded by a casing that essentially extends parallel thereto.

11. A contact switch arrangement according to claim 1, in which, in a region between said switch element means and said rocker-type push mechanism, illuminating means are disposed in dish-shaped reflector means that are open in a direction toward said rocker-type push mechanism.

12. A contact switch arrangement according to claim 1, in which said switch element means are surrounded by a casing, and which includes means for connecting said casing to said housing.

13. A contact switch arrangement according to claim 12, which includes clip means for effecting connection of said casing to said housing.

14. A multiple contact switch arrangement where from a nonoperative position two switch positions can be assumed via respective manually actuatable rocker-type switches for operating windows in a motor vehicle, comprising:
   a housing for accommodating at least two of said rocker-type switches, each of which further comprises:
   switch element means mounted in said housing and having two essentially flat switch springs that are provided with switch contacts for interaction with contacts of operational circuit means;
   a manually operated rocker-type push mechanism that is pivotable mounted in said housing, and
   two actuating elements in the form of push members that are pivotably connected to said rocker-type push mechanism, are disposed essentially perpendicular to said switch springs, and each rest upon a respective one of said switch springs.

\* \* \* \* \*